BI-DIRECTIONAL REEL CLUTCH DRIVE

Filed Jan. 11, 1962 2 Sheets-Sheet 1

INVENTORS.
DANIEL P. DARWIN
DONALD K. REX

BY

Otto Schmid, Jr.
AGENT

Dec. 29, 1964 D. P. DARWIN ETAL 3,163,373

BI-DIRECTIONAL REEL CLUTCH DRIVE

Filed Jan. 11, 1962 2 Sheets-Sheet 2

United States Patent Office 3,163,373
Patented Dec. 29, 1964

3,163,373

BI-DIRECTIONAL REEL CLUTCH DRIVE

Daniel P. Darwin, Saratoga, and Donald K. Rex, San Jose, Calif., assignors to International Business Machines Corporation, New York, N.Y., a corporation of New York Filed Jan. 11, 1962, Ser. No. 165,584
5 Claims. (Cl. 242—55.12)

This invention relates to a record tape drive and more particularly to an improved reel drive for use therein.

This invention relates to an improvement in a tape drive wherein pneumatic clutches are used to selectively drive the reel of record tape under control of the position of a tape loop within a tape column. An example of such a tape drive is that described in co-pending application Serial No. 164,835, filed January 8, 1962, "Tape Drive" by L. R. Harper. While the tape drive performed satisfactorily in all respects it was found that the acceleration and deceleration characteristics could be considerably improved by using a selectively operable bi-directional reel drive system under control of the position of a tape loop within a tape column.

It is therefore an object of the present invention to provide a record tape drive mechanism having a high rate of tape acceleration and deceleration.

It is another object of the invention to provide a record tape reel drive mechanism having means for driving the reel bi-directionally under control of the position of a tape loop.

It is a further object of this invention to provide a pneumatic clutch for driving a record tape reel in either direction under control of the position of a loop of the record tape.

According to the invention, a record tape drive is provided wherein the reels may be selectively driven for either winding or reeling tape by means of pneumatic clutches which are actuated directly from the vacuum tape columns according to the position of a tape loop relative to two spaced sensing means in the tape columns.

The foregoing and other objects, features and advantages of the invention will be apparent from the following more particular description of a preferred embodiment of the invention as illustrated in the accompanying drawings.

Figure 1:
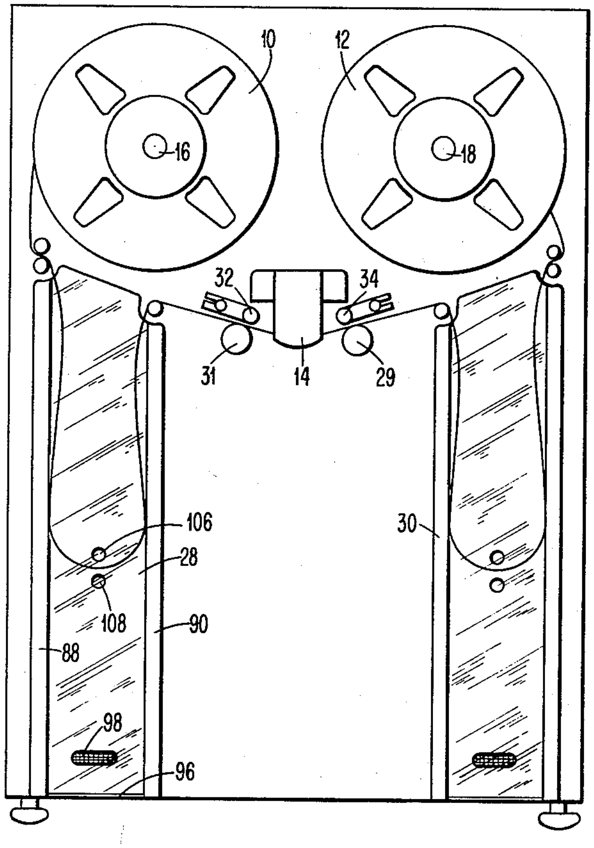
FIG. 1 is a front elevational view of a tape feeding mechanism embodying the invention.
Figure 2:
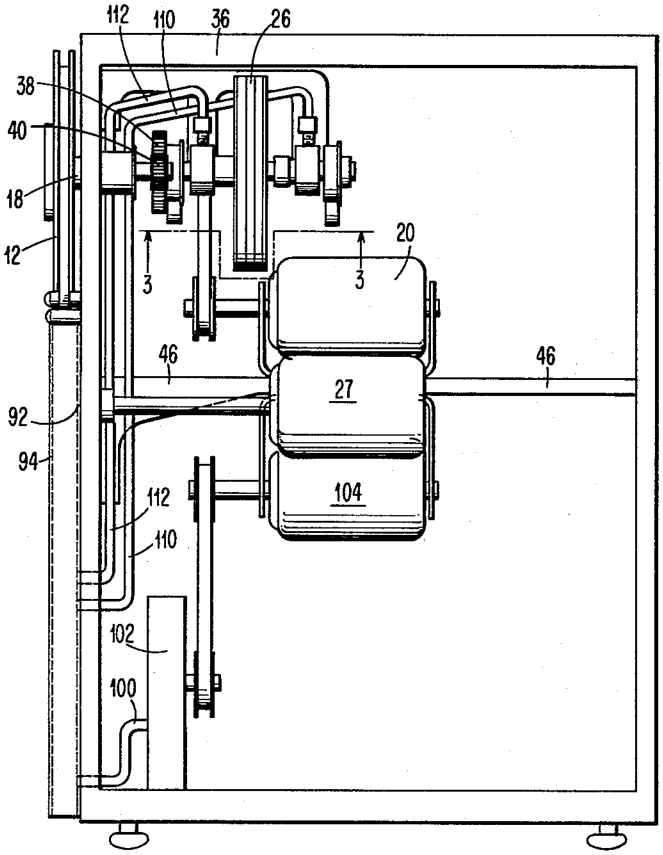
FIG. 2 is a side elevational view of the tape feeding mechanism with the outer casing removed to show the location of underlying mechanism.

A general understanding of the machine and its function may be attained by reference to FIGS. 1 and 2 of the drawings. A pair of tape reels 10, 12 adapted to hold a coil of record tape are intermittently driven to provide a pair of tape loops upon which the mechanism for feeding the tape through a tape sensing head 14 may call as the tape is to be fed in either of two directions. A tape reel which is designated as a file reel 10 is mounted on a drive spindle 16. It may be assumed that the reel has thereon a coil of tape on which data has been recorded and from which the tape is to be fed through the tape reading and recording head 14. In its forward feed direction, the tape passes through the tape reading head 14 and is coiled on a second reel 12 which is designated as a machine reel. The machine reel 12 is mounted on a drive spindle 18.

The file reel drive spindle and machine reel drive spindle are selectively rotated by suitable drive means. In the embodiment shown a single drive motor 20 is used to drive both reels. The motor normally imparts constant drive to a pair of pneumatic clutch mechanisms 24, 26 mounted on each of the drive spindles. The nature of the pneumatic clutches will be developed in greater detail at a later point. Upon selective clutching of the pneumatic clutch mechanisms in drive relation to the drive spindles, these spindles, and consequently the tape reels attached thereto, may be caused to reel or unreel tape from the coil.

It is important that a supply of tape be provided with little load or tension thereon to provide for quick acceleration and deceleration of the tape through the tape head, and to this end the driving mechanism for the reels provides a pair of tape loops disposed in a pair of tape columns 28, 30. Each of the columns has means responsive to the position of the respective tape loops for maintaining a relatively stable position of these loops within the columns. The loop sensitive means within the columns control the reel drive mechanism in such manner that the loops are maintained substantially constant in length. The tape reel drive mechanism for each reel operates independently of the other and both reels are driven independently of feed of tape through the tape head.

Tape from the loop supply in the columns is driven through the tape head by means of a pair of tape drive capstans kept rotating constantly by drive motor 27. In FIG. 1, a tape drive capstan 29 may be deemed to be constantly rotated in a clockwise direction and may consequently be designated the reverse drive capstan. A similar constantly rotating capstan 31 may be deemed to be driven in a counterclockwise direction and may, therefore, be designated the forward drive capstan. In connection with the drive capstans there are provided a pair of solenoid operated pinch rolls 32, 34 and the pinch rolls are adapted to move a tape trained thereabout into driving contact with the tape drive capstan.

Figure 4:
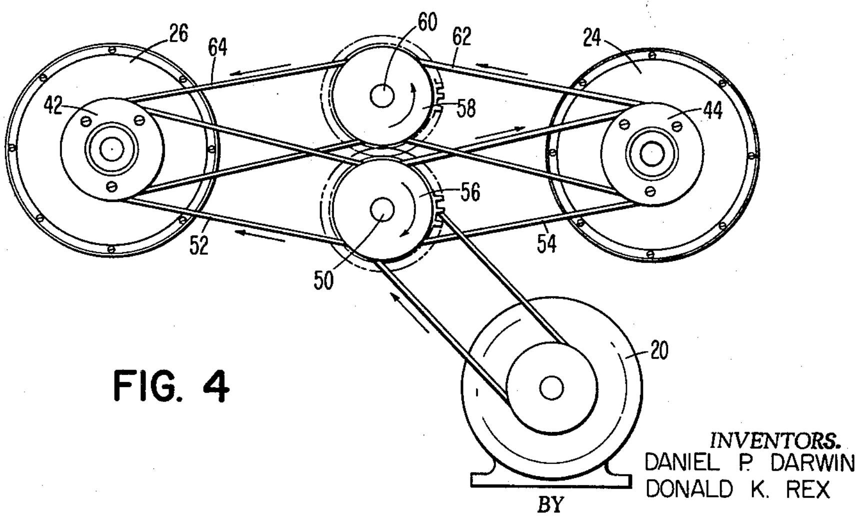
FIG. 4 is a rear view illustrating the tape driving mechanism.

The mechanism for driving the tape reels 10 and 12 may now be referred to in connection with FIGS. 2 and 4. The spindles 16 and 18 are mounted for rotation in a frame member 36. The spindle 18 has mounted on one end the reel 12 and on the other end a gear 38 which is driven through gear 40 by clutch 26. The spindle 16 is driven in a similar manner through clutch 24. The drive pulleys 42, 44 are adapted for continuous rotation under the influence of the drive motor 20. The drive motor 20 is mounted on supporting structure 46 in such a position that the motor shaft is in substantial vertical alignment with drive pulley 48 which is mounted on idler shaft 50. Attached to each end of idler shaft 50 is a drive pulley, one of which is connected through belt 52 to drive pulley 42 of clutch 26 in a clockwise direction and the other of which is connected by belt 54 to drive the front drive pulley of clutch 24 in a clockwise direction. A direction changing gear 56 is also attached to the idler shaft 50 and this gear mates with gear 58 which is mounted on idler shaft 60. Also mounted on idler shaft 60 are two pulleys. One of the pulleys is connected through belt 62 for driving pulley 44 in a counterclockwise direction whereas the other pulley is connected through belt 64 to drive pulley 46 in a counterclockwise direction.

Figure 3:
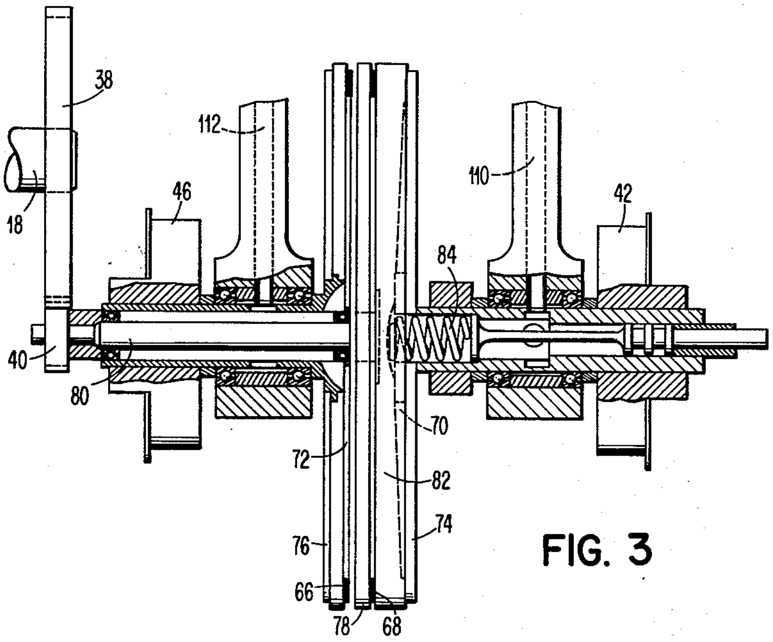
FIG. 3 is a view on line 3—3 of FIG. 2 illustrating the details of the reel drive clutch.

FIG. 3 of the drawings illustrates the specific nature of the clutch units 24, 26. These units are of identical structure and the description of one of the clutches will, therefore, suffice as a description for both. The clutch comprises a pair of constantly running drive pulleys 42, 46. One of the drive pulleys 42 is rotating in a direction to drive the reel 12 clockwise whereas the other pulley 46 is turning in a direction to drive the reel counterclockwise. Attached to each of the constantly running drive pulleys is a friction disk 66, 68. Each of the disks is supported by a thin metal diaphragm 74, 76 so that axial motion of the disk is possible under condition of changing pressure within the chambers formed by the disks and diaphragms. A clutch plate 78 is attached to shaft 80 which rotates the reel through gears 38, 40. Two separate vacuum chambers 70, 72 are formed within the clutch. One clutch chamber 70 is formed by the thin metal disk 74 which is sealed and secured at its edges to a matching surface of a hollowed disk 82. Disk 82 is also urged toward the clutch plate 78 by means of the tension of a spring 84 which is disposed within the interior chamber 70. The second chamber 72 is formed by inclosed interior portions of the left friction disk 68 (as shown in FIG. 3), the diaphragm 76 and the clutch plate 78. It can be seen that the amount and direction of torque connected to the clutch plate 78 depends on the pressure in the right-hand and left-hand chambers. The right-hand chamber 70 of the clutch (as shown in FIG. 3) is connected directly through line 110 to the bottom port 108 on the tape column whereas the left-hand chamber 72 is connected through line 112 to the top port 106 of the tape column. It will be apparent now that when the right-hand friction disk 66 is caused to move to the left, as shown in FIG. 3, drive will be imparted to the shaft 80 to drive the reel clockwise; when the left-hand friction disk 68 is moved to the right, drive will be imparted to the shaft 80 to drive the reel counterclockwise.

The means for effecting the movement of the friction disks comprises means for sensing the condition of the pressure from the tape column at two spaced points.

The position of the tape loops in control columns relative to the spaced points determines the pressure condition so the position of the tape loop is utilized to control the rotary movement of the tape reel. Herein by way of example, there has been illustrated a vacuum control system for achieving this objective. The tape control colums 28, 30 are of the same construction and their specific nature may best be seen in FIGS. 1 and 2 of the drawings. The columns herein illustrated comprise a pair of sidewalls 88, 90, a back panel 92, a transparent face plate 94, and a bottom wall 96 all joined in air-tight contact. At the base of a column is a port 98 which is connected by line 100 to a vacuum pump 102 adapted to be driven by a suitable power source such as motor 104. The foregoing provides a structure by means of which the control columns may be evacuated when the upper ends thereof are closed against the atmosphere.

Side walls of the vacuum columns are of a width substantially equal to the width of the tape so that, when a tape loop is formed in either of the vacuum columns, the oppositely disposed marginal edges of the loop will be in substantial contact with the base plate and the face plate of the respective vacuum columns. This disposition of the tape loop within the vacuum column is assured by the tape guide structure; and the back of the tape will, through the major portion of the tape loop, substantially contact the side walls of the column thereby forming an air seal between the lower portion of the tape loop and the column walls. Two ports 106, 108 are provided on the back panel 92 of the vacuum columns to sense the pressure at that point. The bottom port 108 is connected through line 110 to provide the operative pressure for chamber 70 of the clutch and the top port 106 is connected through line 112 to provide the operative pressure for chamber 72 of the clutch 26. Thus, it can be seen that when the level of the tape loop in the tape column is above the port, the cooperating pneumatic chamber will sense the vacuum applied to the bottom of the column; whereas, if the level of the tape loop in the column is below the port, the pneumatic chamber will be responsive to substantially atmospheric pressure from above the tape.

The device is designed so that the tape loops in the control column are maintained somewhere across the lower port as a nominal position. When the tape loop level is below the lower port 108 the port is open to atmospheric pressure and the spring 84 forces the right-hand friction disk 66 into driving contact with the clutch plate 78 so that the reel is driven clockwise. This winds tape on the reel until the tape reaches its equilibrium point which is achieved when the tape level in the column is somewhere across the bottom port. If the level of the tape in the tape columns goes above the bottom port 108 the pressure in the right-hand chamber 70 is reduced to below atmospheric pressure and, through the diaphragm action, draws the friction disk away from the clutch plate. So long as the level of the tape in the tape column is below the top port 106, atmospheric pressure is applied to the left-hand chamber 72 of the clutch so that the left-hand friction disk 68 is out of driving contact with the clutch plate 78. When the level of the tape in the tape column goes above the top port, the pressure in the left-hand chamber is reduced to below atmospheric pressure thereby pulling the left-hand friction disk into engagement with the clutch plate. This action imparts a counterclockwise drive to the reel thereby reeling tape from the reel and restoring the tape loop to its equilibrium position.

When the machine is turned on, the source of vacuum and atmospheric pressure above the tape causes loops to form in the control columns as tape is pulled off the reels. This action continues until the tape opens part of the lower port 108 to atmospheric pressure and the tape loop reaches the equilibrium point wherein the tape level in the column is somewhere across the lower port. When it is desired to feed the tape through the reading head, the tape drive capstan feeds tape into the column 30 and the tape is drawn below the lower port 108 by the pressure forces across the tape causing the pressure in the right-hand chamber 70 to approach atmospheric pressure. This allows the spring 84 to force friction disk 66 into full engagement with the clutch plate 78 which drives the reel to take up tape until the tape level again reaches the equilibrium point. As the tape attempts to go above the lower port 108, the pressure in the right-hand chamber 70 is reduced below atmospheric pressure and the diaphragm action draws the right-hand friction disk 66 away from driving contact with the clutch plate 78. When the capstan stops feeding the tape the reel inertia causes the reel to continue rotating, thereby raising the level of the tape in the column 30. As the tape goes above the upper port 106, vacuum is applied to the left-hand chamber 72 which, through the diaphragm action, allows atmospheric pressure to force the left-hand friction disk 68 against the clutch plate 78 and thereby apply a torque to the reel to reverse the reel rotation and restore the tape level to its home or nominal position. If it is desired to feed tape in the other direction, as the capstan feeds tape out of the column 30, the tape level rises in the column thereby connecting the upper port and the left-hand chamber of the clutch to the vacuum source causing the left-hand friction disk to apply a correcting torque to the reel to restore the tape level to its nominal position.

Thus, it can be seen that there results a tape drive in which rapid acceleration and deceleration of tape is achieved due to the bi-directional drive of the reels controlled directly from the tape columns by means of the level of the tape loop within the tape columns.

While the invention has been particularly shown and described with reference to a preferred embodiment thereof, it will be understood by those skilled in the art that the foregoing and other changes in the form and details may be made therein without departing from the spirit and scope of the invention.

What is claimed is:

1. In a tape drive comprising a reel, drive means and an evacuable tape column having a source of reduced pressure therein said record tape disposed relative to said tape column so that a loop is formed therein;

a plurality of pressure sensing means in said tape column;

a pneumatic clutch having a plurality of vacuum chambers;

means for connecting said pressure sensing means to said vacuum chambers;

said clutch selectively actuated to drive said reel in either direction according to the position of said record tape in said tape column relative to said sensing means.

2. A record tape reel drive comprising a reel, drive means;

a pneumatic clutch comprising a pair of vacuum chambers selectively actuable to either wind or reel record tape on said reel;

an evacuable enclosure into which a portion of said record tape is disposed;

a pair of spaced apart ports to sense the pressure condition in said evacuable enclosure;

means for connecting said ports directly to said vacuum chambers so that said clutch is actuated according to the position of said record tape portion relative to said ports.

3. A pneumatic clutch for establishing driving connection between a power source and a reel to selectively rotate the reel in either direction said clutch comprising: a first and a second chamber;

means for transmitting pressure variations to said chambers;

drive means responsive to a first pressure in each of said chambers to drive the reel in one direction;

said drive means responsive to a partial vacuum in each of said chambers to drive said reel in the opposite direction and responsive to said first pressure in one of said chambers and a partial vacuum in the other of said chambers to remove said drive from said reel.

4. Drive means for a record tape reel wherein a record tape from said reel forms a loop extending into a vacuum column comprising: a pneumatic clutch having a first and a second chamber;

a first and a second pressure sensing port spaced apart on said vacuum column;

means connecting said first port to said first chamber;

means connecting said second port to said second chamber;

said clutch being actuated to drive the tape in one direction when said tape loop is above said first pressure sensing port and being actuated to drive the tape in the opposite direction when the tape loop is above the second pressure sensing port.

5. Means for feeding tape from a reel through a vacuum chamber to a work station including:

a vacuum chamber, a plurality of means for developing pressure variations in accordance with the position of said tape within said vacuum chamber, pneumatic clutch means comprising a plurality of pneumatic chambers, and means for coupling said plurality of pressure variation developing means to said plurality of pneumatic chambers whereby said clutch is selectively actuated to drive said reel in either direction according to the position of the tape in the vacuum chamber.

References Cited in the file of this patent

UNITED STATES PATENTS

| | | |
|---|---|---|
| 2,988,297 | Pawlowski | June 13, 1961 |
| 3,002,597 | Warman et al. | Oct. 3, 1961 |